US012751456B2

(12) United States Patent
Lin et al.

(10) Patent No.: US 12,751,456 B2
(45) Date of Patent: Oct. 6, 2026

(54) ANTIVIRAL ENVIRONMENT-FRIENDLY COMPOSITE PLATING LAYER, PREPARATION METHOD THEREFOR, AND ANTIVIRAL ENVIRONMENT-FRIENDLY PRODUCT

(71) Applicant: JOMOO KITCHEN & BATH CO., LTD, Nan'an City (CN)

(72) Inventors: Xiaofa Lin, Nan'an City (CN); Xiaoshan Lin, Nan'an City (CN); Xiaolong Liu, Nan'an City (CN); Xiaowei Lin, Nan'an City (CN); Dongliang Peng, Nan'an City (CN); Yining Zhang, Nan'an City (CN)

(73) Assignee: JOMOO KITCHEN & BATH CO., LTD, Nan'an City (CN)

( * ) Notice: Subject to any disclaimer, the term of this patent is extended or adjusted under 35 U.S.C. 154(b) by 331 days.

(21) Appl. No.: 18/683,457

(22) PCT Filed: Apr. 12, 2022

(86) PCT No.: PCT/CN2022/086296
§ 371 (c)(1),
(2) Date: Feb. 13, 2024

(87) PCT Pub. No.: WO2023/164992
PCT Pub. Date: Sep. 7, 2023

(65) Prior Publication Data

US 2024/0349729 A1 Oct. 24, 2024

(30) Foreign Application Priority Data

Mar. 1, 2022 (CN) ......................... 202210194674.4

(51) Int. Cl.
*A01N 59/16* (2006.01)
*A01N 25/34* (2006.01)
(Continued)

(52) U.S. Cl.
CPC ............ *A01N 59/16* (2013.01); *A01N 25/34* (2013.01); *A01N 33/12* (2013.01); *A01P 1/00* (2021.08);
(Continued)

(58) Field of Classification Search
None
See application file for complete search history.

(56) References Cited

U.S. PATENT DOCUMENTS 4,073,927 A 2/1978 Freilich
2006/0121180 A1 6/2006 Gertner et al.
(Continued)

FOREIGN PATENT DOCUMENTS

CN 102936742 A 2/2013
CN 106835011 A 6/2017
(Continued)

OTHER PUBLICATIONS

First Office Action for Chinese Application No. 2022101946744, dated May 7, 2023, 20 Pages including English Translation.
(Continued)

*Primary Examiner* — Wojciech Haske
(74) *Attorney, Agent, or Firm* — BROOKS KUSHMAN P.C.

(57) ABSTRACT

An antiviral environment-friendly composite plating layer, a preparation method therefor, and an antiviral environment-friendly product. The antiviral environment-friendly composite plating layer includes: a semi-bright nickel layer, a microporous nickel layer and an environment-friendly black chromium composite antiviral layer; the semi-bright nickel layer is provided on a base material having antiviral requirements; the microporous nickel layer is provided on the surface of the side of the semi-bright nickel layer away from the base material; the environment-friendly black chromium
(Continued)

composite antiviral layer is provided on the surface of the side of the microporous nickel layer away from the base material; the environment-friendly black chromium composite antiviral layer has a nanoneedle structure and is formed by a composite raw material containing an antiviral ammonium salt, and the concentration of the antiviral ammonium salt in the composite raw material is 50-100 g/L.

13 Claims, 6 Drawing Sheets

(51) Int. Cl.

| | |
|---|---|
| ***A01N 33/12*** | (2006.01) |
| ***A01P 1/00*** | (2006.01) |
| ***C25D 3/06*** | (2006.01) |
| ***C25D 3/08*** | (2006.01) |
| ***C25D 3/12*** | (2006.01) |
| ***C25D 5/00*** | (2006.01) |
| ***C25D 5/14*** | (2006.01) |
| ***C25D 5/34*** | (2006.01) |
| ***C25D 5/56*** | (2006.01) |

(52) U.S. Cl.

CPC ................. *C25D 3/06* (2013.01); *C25D 3/08* (2013.01); *C25D 3/12* (2013.01); *C25D 5/14* (2013.01); *C25D 5/34* (2013.01); *C25D 5/56* (2013.01); *C25D 5/605* (2020.08); *C25D 5/615* (2020.08); *C25D 5/623* (2020.08)

(56) References Cited

U.S. PATENT DOCUMENTS

| | | | | |
|---|---|---|---|---|
| 2009/0317556 | A1* | 12/2009 | Macary .................. | C25D 5/623 427/438 |
| 2011/0065804 | A1 | 3/2011 | Diaddario et al. | |
| 2019/0037841 | A1 | 2/2019 | Zhang et al. | |
| 2023/0193497 | A1* | 6/2023 | Özkaya .................... | C25D 3/06 428/637 |

FOREIGN PATENT DOCUMENTS

| | | | |
|---|---|---|---|
| CN | 108777957 | A | 11/2018 |
| CN | 109811374 | A | 5/2019 |
| CN | 111826696 | A | 10/2020 |
| CN | 111910230 | A | 11/2020 |
| CN | 215481342 | U | 1/2022 |
| WO | 2019215287 | A1 | 11/2019 |

OTHER PUBLICATIONS

International Search Report for Application No. PCT/CN2022/086296, dated Nov. 25, 2022, 5 Pages including English Translation.

Second Office Action for Chinese Application No. 2022101946744, dated Oct. 11, 2023, 8 Pages including English Translation.

European Search Report for Application No. 22174502.9 dated Nov. 15, 2022, 8 Pages including English Translation.

Jinghua, Yin, An Introduction to Functional Materials, p. 173.

Junping, Yuan, Popular Jewelry Materials and Production Processes, Part 5 on p. 292, Wuhan: China University of Geosciences Press, 2015.6.

Zhengjun, Zhou, Industrial Robot Tooling Design, Part 2 on p. 121, Beijing Institute of Technology Press.

Yuncheng, Zhang, Electroplating Manual, 4th Edition, pp. 201-253 and pp. 251-253, National Defense Industry Press, Beijing.

* cited by examiner

ANTIVIRAL ENVIRONMENT-FRIENDLY COMPOSITE PLATING LAYER, PREPARATION METHOD THEREFOR, AND ANTIVIRAL ENVIRONMENT-FRIENDLY PRODUCT

CROSS-REFERENCE TO RELATED APPLICATIONS

This application is the U.S. national phase of PCT Application No. PCT/CN2022/086296 filed on Apr. 12, 2022, which claims priority to Chinese Patent Application No. 202210194674.4 filed on Mar. 1, 2022, which are hereby incorporated herein by reference in their entireties.

TECHNICAL FIELD

The application relates to, but is not limited to, the field of antiviral technology, and in particular to an antiviral and environment-friendly composite plating layer, a preparation method thereof and an antiviral and environment-friendly product.

BACKGROUND

Novel coronavirus pneumonia (abbreviated as "COVID-19") epidemic situation has brought great risks and threats to the health of people all over the world, and COVID-19 has also aroused great attention from countries all over the world to the antiviral industry, especially to antiviral kitchen and bathroom household products. At present, the surface materials of kitchen and bathroom household hardware products in the market are mainly prepared by the traditional technology of electroplating hexavalent chromium. However, hexavalent chromium is a common heavy metal pollutant in the electroplating industry, and the electroplating waste liquid can pollute water sources and soil for a long time, bringing irreparable damage to the ecological environment. Moreover, hexavalent chromium is a swallowed poison/inhaled extreme poison, which may cause allergy when in contact with human skin, and is more likely to cause hereditary genetic defects, and may cause cancer when inhaled. Some products also adopt baking varnish or powder spraying processes, that is, spraying paint or powder on the surface of a substrate and curing, to prepare a paint layer or a powder layer; however, it has poor texture, low hardness, and low grade and is not wear resistant, not environment-friendly.

In addition, the industrialized products prepared by electroplating technology alone cannot achieve antiviral function currently-some researchers have added Ag composite materials into an electroplating chromic acid solution, however, silver chromate would precipitate, resulting in no antiviral function of the products obtained by electroplating. It is also usually necessary to perform high-temperature/ultraviolet disinfection or antiviral treatment on the electroplated products, or coat/plate them with composite materials containing nano $Ag^+$ for resisting virus. Disinfection or antiviral at high temperature/ultraviolet is costly, while nano $Ag^+$ composite materials are extremely easy to be absorbed by sweat pores of human skin, which will affect and damage organs of a human body such as immune system, nervous system, reproductive system and the like.

SUMMARY

The following is a summary of the subject matter described in detail herein. This summary is not intended to limit the scope of protection of the present application.

The present application provides an antiviral and environment-friendly composite plating layer, which includes: a semi-bright nickel layer, a microporous nickel layer and an environment-friendly black chromium composite antiviral layer; the semi-bright nickel layer is adapted to be positioned on a substrate having an antiviral requirement; the microporous nickel layer is disposed on the surface of a side of the semi-bright nickel layer away from the substrate; the environment-friendly black chromium composite antiviral layer is disposed on the surface of a side of the microporous nickel layer away from the substrate; the environment-friendly black chromium composite antiviral layer has a nano-needle structure, and is formed by a composite raw material containing antiviral ammonium salt, and the concentration of the antiviral ammonium salt in the composite raw material is 50 g/L to 100 g/L.

In an embodiment of the present application, the antiviral ammonium salt may be selected from any one or more of alkyl quaternary ammonium iodide salt and alkyl aromatic hydrocarbyl quaternary ammonium iodide salt.

In an embodiment of the present application, the carbon chain length of the alkyl groups in the alkyl quaternary ammonium iodide salt and the alkyl aromatic hydrocarbyl quaternary ammonium iodide salt may be 12 to 18.

In an embodiment of the present application, the antiviral ammonium salt may be selected from any one or more of dodecyl dimethyl benzyl ammonium iodide, dodecyl trimethyl ammonium iodide, tetradecyl dimethyl benzyl ammonium iodide, tetradecyl trimethyl ammonium iodide, hexadecyl dimethyl benzyl ammonium iodide, hexadecyl trimethyl ammonium iodide, octadecyl dimethyl benzyl ammonium iodide, and octadecyl trimethyl ammonium iodide.

In an embodiment of the present application, the raw material of the environment-friendly black chromium composite antiviral layer may include: quaternary ammonium iodide salt with a concentration of 50 g/L to 100 g/L, anhydrous citric acid crystal with a concentration of 10 g/L to 20 g/L, trivalent chromium additive-TRICHROME™ ADDITIVE with a concentration of 300 g/L to 500 g/L, trivalent chromium stabilizer-TRICHROME™ STABILIZER with a concentration of 50 mL/L to 100 mL/L, trivalent chromium regulator LR-TRICHROME™ REGULATOR LR with a concentration of 1 mL/L to 10 mL/L, trivalent chromium corrector-TRICHROME™ CORRECTOR with a concentration of 2 mL/L to 10 mL/L, and shadow trivalent chromium makeup agent-TRICHROME™ SHADOW MAKE UP with a concentration of 30 mg/L to 50 mL/L.

In an embodiment of the present application, the raw material of the microporous nickel layer may include: nickel sulfate with a concentration of 150 g/L to 400 g/L, nickel chloride with a concentration of 60 g/L to 120 g/L, boric acid with a concentration of 30 g/L to 80 g/L, bright nickel ZD-220™ with a concentration of 0.1 mL/L to 0.5 mL/L, liquid additive MPS 800™ with a concentration of 5 mL/L to 80 mL/L, and liquid additive Mark 904™ with a concentration of 0.1 mL/L to 2 mL/L.

In an embodiment of the present application, the raw material of the semi-bright nickel layer may include: nickel sulfate with a concentration of 350 g/L to 450 g/L, nickel chloride with a concentration of 30 g/L to 50 g/L, boric acid with a concentration of 40 g/L to 60 g/L, makeup agent NIB-90™ with a concentration of 5 mL/L to 10 mL/L, main brightener NIB-90™ with a concentration of 1 mL/L to 2 mL/L and wetting agent Ni-66B™ with a concentration of 1 mL/L to 5 mL/L.

In an embodiment of the present application, the thickness of the semi-bright nickel layer may be 20 μm to 50 μm, the thickness of the microporous nickel layer may be 20 μm to 50 μm, and the thickness of the environment-friendly black chromium composite antiviral layer may be >0.5 μm.

The present application further provides a preparation method of the antiviral and environment-friendly composite plating layer as described above, which includes:

(1) pretreating the substrate: including polishing and cleaning treatments;

(2) electroplating the semi-bright nickel layer on the surface of the pretreated substrate;

(3) electroplating the microporous nickel layer on the surface of the semi-bright nickel layer;

(4) electroplating the environment-friendly black chromium composite antiviral layer on the surface of the microporous nickel layer.

In an embodiment of the present application, the conditions for electroplating the semi-bright nickel layer in step (2) may include: a temperature of 45° C. to 60° C., a cathode current density of 5 A/dm$^2$ to 15 A/dm$^2$, and an electroplating time of 900 s to 1800 s.

In an embodiment of the present application, the conditions for electroplating the microporous nickel layer in step (3) may include: a temperature of 45° C. to 60° C., a cathode current density of 5 A/dm$^2$ to 15 A/dm$^2$, and an electroplating time of 900 s to 1800 s.

In an embodiment of the present application, the conditions for electroplating the environment-friendly black chromium composite antiviral layer in step (4) may include: a temperature of 30° C. to 40° C., a cathode current density of 8 A/dm$^2$ to 15 A/dm$^2$, and an electroplating time of 900 s to 1200 s.

The present application further provides an antiviral and environment-friendly product, which includes a substrate and the antiviral and environment-friendly composite plating layer as described above.

In an embodiment of the present application, the substrate may be a metal substrate or a plastic substrate.

In an embodiment of the present application, the antiviral and environment-friendly product may be an antiviral product used in kitchen or bathroom.

Additional features and advantages of the present application will be set forth in the description which follows, and in part will become clearer from the description, or may be learned by practice of the application. Other advantages of the present application can be realized and obtained by embodiments described in the description and the drawings.

BRIEF DESCRIPTION OF DRAWINGS

The drawings are used to provide an understanding of the technical schemes of the present application, and constitute a part of the specification. They are used to explain the technical schemes of the present application together with the embodiments of the present application, and do not constitute a limitation to the technical schemes of the present application.

DETAILED DESCRIPTION

In order to make the objectives, technical schemes and advantages of the present application clearer, the examples of the present application will be described in detail below in connection with the drawings. It should be noted that the examples in the present application and the features in the examples may be arbitrarily combined with each other provided that there is no conflict.

Figure 1:
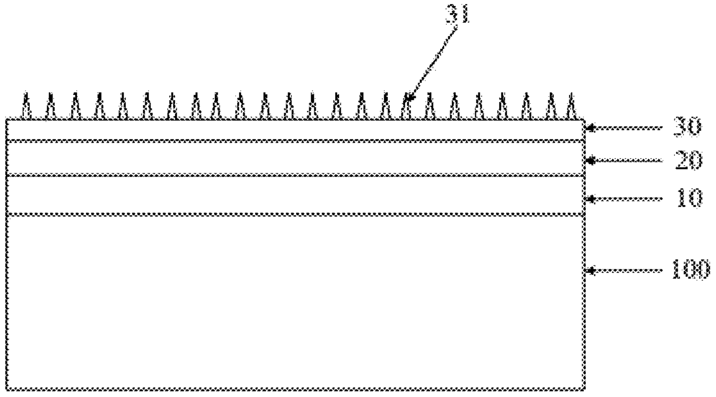
FIG. 1 is a schematic structural diagram of the front view of the antiviral and environment-friendly composite plating layer according to an embodiment of the present application.

An embodiment of the present application provides an antiviral and environment-friendly composite plating layer, as shown in FIG. 1. The antiviral and environment-friendly composite plating layer includes a semi-bright nickel layer 10, a microporous nickel layer 20 and an environment-friendly black chromium composite antiviral layer 30; the semi-bright nickel layer 10 is adapted to be positioned on a substrate 100 having an antiviral requirement; the microporous nickel layer 20 is disposed on the surface of a side of the semi-bright nickel layer 10 away from the substrate 100; the environment-friendly black chromium composite antiviral layer 30 is disposed on the surface of a side of the microporous nickel layer 20 away from the substrate 100; the environment-friendly black chromium composite antiviral layer 30 has a nano-needle structure 31, and is formed by a composite raw material containing antiviral ammonium salt, and the concentration of the antiviral ammonium salt in the composite raw material is 50 g/L to 100 g/L.

In an embodiment of the present application, the antiviral ammonium salt may be selected from any one or more of alkyl quaternary ammonium iodide salt and alkyl aromatic hydrocarbyl quaternary ammonium iodide salt.

In an embodiment of the present application, the carbon chain length of the alkyl groups in the alkyl quaternary ammonium iodide salt and the alkyl aromatic hydrocarbyl quaternary ammonium iodide salt may be 12 to 18.

In an embodiment of the present application, the antiviral ammonium salt may be selected from any one or more of dodecyl dimethyl benzyl ammonium iodide, dodecyl trimethyl ammonium iodide, tetradecyl dimethyl benzyl ammonium iodide, tetradecyl trimethyl ammonium iodide, hexadecyl dimethyl benzyl ammonium iodide, hexadecyl trimethyl ammonium iodide, octadecyl dimethyl benzyl ammonium iodide, and octadecyl trimethyl ammonium iodide.

In an embodiment of the present application, the raw material of the environment-friendly black chromium composite antiviral layer may include: quaternary ammonium iodide salt with a concentration of 50 g/L to 100 g/L, anhydrous citric acid crystal with a concentration of 10 g/L to 20 g/L, trivalent chromium additive-TRICHROME™ ADDITIVE with a concentration of 300 g/L to 500 g/L, trivalent chromium stabilizer-TRICHROME™ STABILIZER with a concentration of 50 mL/L to 100 mL/L, trivalent chromium regulator LR-TRICHROME™ REGULATOR LR with a concentration of 1 mL/L to 10 mL/L, trivalent chromium corrector-TRICHROME™ CORRECTOR with a concentration of 2 mL/L to 10 mL/L, and shadow trivalent chromium makeup agent-TRICHROME™ SHADOW MAKE UP with a concentration of 30 mL/L to 50 mL/L.

In an embodiment of the present application, the raw material of the microporous nickel layer may include: nickel sulfate with a concentration of 150 g/L to 400 g/L, nickel chloride with a concentration of 60 g/L to 120 g/L, boric acid with a concentration of 30 g/L to 80 g/L, bright nickel ZD-220™ with a concentration of 0.1 mL/L to 0.5 mL/L, liquid additive MPS 800™ with a concentration of 5 to 80 mL/L, and liquid additive Mark 904™ with a concentration of 0.1 mL/L to 2 mL/L.

In an embodiment of the present application, the raw material of the semi-bright nickel layer may include: nickel sulfate with a concentration of 350 g/L to 450 g/L, nickel chloride with a concentration of 30 g/L to 50 g/L, boric acid with a concentration of 40 g/L to 60 g/L, makeup agent NIB-90™ with a concentration of 5 mL/L to 10 mL/L, main brightener NIB-90™ with a concentration of 1 mL/L to 2 mL/L and wetting agent Ni-66B™ with a concentration of 1 mL/L to 5 mL/L.

In the description of the present application, the concentration (g/L, mL/L) of a certain raw material for preparing the semi-bright nickel layer, the microporous nickel layer or the environment-friendly black chromium composite antiviral layer refers to the concentration of the raw material in a mixed solution consisting of all raw materials for preparing the semi-bright nickel layer, the microporous nickel layer or the environment-friendly black chromium composite antiviral layer.

In an embodiment of the present application, the thickness of the semi-bright nickel layer may be 20 μm to 50 μm, the thickness of the microporous nickel layer may be 20 μm to 50 μm, and the thickness of the environment-friendly black chromium composite antiviral layer may be >0.5 μm.

In the antiviral and environment-friendly composite plating layers according to the embodiments of the present application, the semi-bright nickel layer and the microporous nickel layer can form a corrosion-resistant composite layer. Among them, the raw materials of the semi-bright nickel layer do not contain sulfur, and therefore, the semi-bright nickel layer has low stress, excellent leveling, and good flexibility; the microporous nickel layer may form dispersed micropores; the combination of the semi-bright nickel layer with high thickness (e.g. 20 μm to 50 μm) and the microporous nickel layer with high thickness (e.g. 20 μm to 50 μm) can form potential difference and disperse current, which can effectively slow down the corrosion rate of substrate and improve the corrosion resistance. The thickness of the environment-friendly black chromium composite antiviral layer may be >0.5 μm. In this case, the environment-friendly black chromium composite antiviral layer as a decorative appearance layer can exhibit effective protection and wear resistance.

An embodiment of the present application further provides a preparation method of the antiviral and environment-friendly composite plating layer as described above, which includes:

(1) pretreating the substrate: including polishing and cleaning treatments;

(2) electroplating the semi-bright nickel layer on the surface of the pretreated substrate;

(3) electroplating the microporous nickel layer on the surface of the semi-bright nickel layer;

(4) electroplating the environment-friendly black chromium composite antiviral layer on the surface of the microporous nickel layer.

In an embodiment of the present application, the cleaning treatment in the pretreatment in step (1) may include fine cleaning processes such as wax removal, oil removal, electrolysis, pure water cleaning, etc.

In an embodiment of the present application, the conditions for electroplating the semi-bright nickel layer in step (2) may include: a temperature of 45° C. to 60° C., a cathode current density of 5 $A/dm^2$ to 15 $A/dm^2$, and an electroplating time of 900 s to 1800 s.

In an embodiment of the present application, the conditions for electroplating the microporous nickel layer in step (3) may include: a temperature of 45° C. to 60° C., a cathode current density of 5 $A/dm^2$ to 15 $A/dm^2$, and an electroplating time of 900 s to 1800 s.

In an embodiment of the present application, the conditions for electroplating the environment-friendly black chromium composite antiviral layer in step (4) may include: a temperature of 30° C. to 40° C., a cathode current density of 8 $A/dm^2$ to 15 $A/dm^2$, and an electroplating time of 900 s to 1200 s.

In the embodiments of the present application, the semi-bright nickel layer, the microporous nickel layer and the environment-friendly black chromium composite antiviral layer are prepared sequentially on the surface of a substrate by an electroplating method, and thereby, an antiviral and environment-friendly composite plating layer is obtained on the surface of the substrate. The preparation process is simple and low cost, and the environment-friendly black chromium composite antiviral plating layer is formed by electroplating an environment-friendly trivalent chromium material, which avoids the problems that the traditional process of electroplating hexavalent chromium is not environment-friendly and affects the health of production line workers. The environment-friendly black chromium composite antiviral layer of the antiviral and environment-friendly composite plating layer presents black color, such that the antiviral and environment-friendly composite plating layer can show black color and has soft color and beautiful appearance; in addition, the environment-friendly black chromium composite antiviral layer is formed by composite raw materials containing antiviral ammonium salt and has a nano-needle structure, so that the antiviral and environment-friendly composite plating layer has better rapid and broad-spectrum antiviral effect, and the antiviral effect can be obtained without external conditions such as high-temperature sterilization, ultraviolet sterilization, or spraying composite materials containing nano $Ag^{+}$. In addition, the antiviral and environment-friendly composite plating layer according to the embodiments of the present application also has the advantage of corrosion resistance.

An embodiment of the present application further provides an antiviral and environment-friendly product, which includes a substrate and the antiviral and environment-friendly composite plating layer as described above.

In an embodiment of the present application, the substrate may be a metal substrate such as aluminum alloy, copper alloy, zinc alloy, magnesium alloy, stainless steel, alloy steel, etc.; or a plastic substrate such as ABS plastic, etc.

In the embodiment of the present application, the antiviral and environment-friendly product may be an antiviral product used in kitchen or bathroom, for example, a vegetable wash basin, a knife, a faucet, a hand wash basin, a pendant, a shower, a shower room handle, a frame of a shower room, etc.

In the following Examples and Comparative Examples, the makeup agent NIB-90™, the main brightener NIB-90™ and the wetting agent Ni-66B™ were purchased from Xiamen Huahui New Material Technology Co., Ltd.; the bright nickel ZD-2201M, liquid additive MPS 800™, liquid additive Mark 904™, trivalent chromium additive-TRICHROME™ ADDITIVE, trivalent chromium stabilizer-TRICHROME™ STABILIZER, trivalent chromium regulator LR-TRICHROME™ REGULATOR LR, trivalent chromium corrector-TRICHROME™ CORRECTOR, shadow trivalent chromium makeup agent-TRICHROME™ SHADOW MAKE UP were purchased from Atotech (China) Chemicals Ltd. (ATOTECH); and hexadecyl trimethyl ammonium iodide was purchased from Jinjinle Chemicals Co., Ltd.

Example 1

(1) Pretreatment of Electroplating

Polishing and fine cleaning treatments (including wax removal, oil removal, electrolysis and pure water cleaning) of copper alloy substrate are performed;

(2) Electroplating the Semi-Bright Nickel Layer on the Surface of the Pretreated Substrate The electroplating solution for forming the semi-bright nickel layer may include: nickel sulfate with a concentration of 400 g/L, nickel chloride with a concentration of 45 g/L, boric acid with a concentration of 50 g/L, makeup agent NIB-90™ with a concentration of 8 mL/L, main brightener NIB-90™ with a concentration of 1.5 mL/L and wetting agent Ni-66B™ with a concentration of 3 mL/L;

The process conditions of electroplating include: temperature of 55° C., cathode current density of 8 A/dm$^2$, and electroplating time of 1500 s;

(3) Electroplating the Microporous Nickel Layer on the Surface of the Semi-Bright Nickel Layer;

The electroplating solution for forming the microporous nickel layer includes: nickel sulfate with a concentration of 400 g/L, nickel chloride with a concentration of 80 g/L, boric acid with a concentration of 50 g/L, bright nickel ZD-220™ with a concentration of 0.3 mL/L, liquid additive MPS 800™ with a concentration of 30 mL/L, and liquid additive Mark 904™ with a concentration of 0.5 mL/L;

The process conditions of electroplating include: temperature of 55° C., cathode current density of 8 A/dm$^2$, and electroplating time of 1500 s;

(4) Electroplating the Environment-Friendly Black Chromium Composite Antiviral Layer on the Surface of the Microporous Nickel Layer The electroplating solution for forming the environment-friendly black chromium composite antiviral layer includes: hexadecyl trimethyl ammonium iodide with a concentration of 50 g/L, anhydrous citric acid crystal with a concentration of 10 g/L, trivalent chromium additive-TRICHROME™ ADDITIVE with a concentration of 350 g/L, trivalent chromium stabilizer-TRICHROME™ STABILIZER with a concentration of 70 mL/L, trivalent chromium regulator LR-TRICHROME™ REGULATOR LR with a concentration of 6 mL/L, trivalent chromium corrector-TRICHROME™ CORRECTOR with a concentration of 4 mL/L, and shadow trivalent chromium makeup agent-TRICHROME™ SHADOW MAKE UP with a concentration of 35 mL/L;

The process conditions of electroplating include: temperature of 35° C., cathode current density of 12 A/dm$^2$, and electroplating time of 900 s.

Example 2

The preparation method is substantially the same as that of Example 1, except that the concentration of anhydrous citric acid crystal is 20 g/L in the electroplating solution used for electroplating the environment-friendly black chromium composite antiviral layer in Step (4).

Example 3

The preparation method is substantially the same as that of Example 1, except that the concentration of hexadecyl trimethyl ammonium iodide is 100 g/L in the electroplating solution used for electroplating the environment-friendly black chromium composite antiviral layer in Step (4).

Comparative Example 1

The preparation method is substantially the same as that of Example 1, except that the concentration of anhydrous citric acid crystal is 30 g/L in the electroplating solution used for electroplating the environment-friendly black chromium composite antiviral layer in Step (4).

Comparative Example 2

The preparation method is substantially the same as that of Example 1, except that the concentration of anhydrous citric acid crystal is 0 g/L in the electroplating solution used for electroplating the environment-friendly black chromium composite antiviral layer in Step (4).

Comparative Example 3

The preparation method is substantially the same as that of Example 1, except that the concentration of hexadecyl trimethyl ammonium iodide is 0 g/L in the electroplating solution used for electroplating the environment-friendly black chromium composite antiviral layer in Step (4).

Comparative Example 4

The preparation method is substantially the same as that of Example 1, except that the concentration of hexadecyl trimethyl ammonium iodide is 150 g/L in the electroplating solution used for electroplating the environment-friendly black chromium composite antiviral layer in Step (4).

Figure 2:
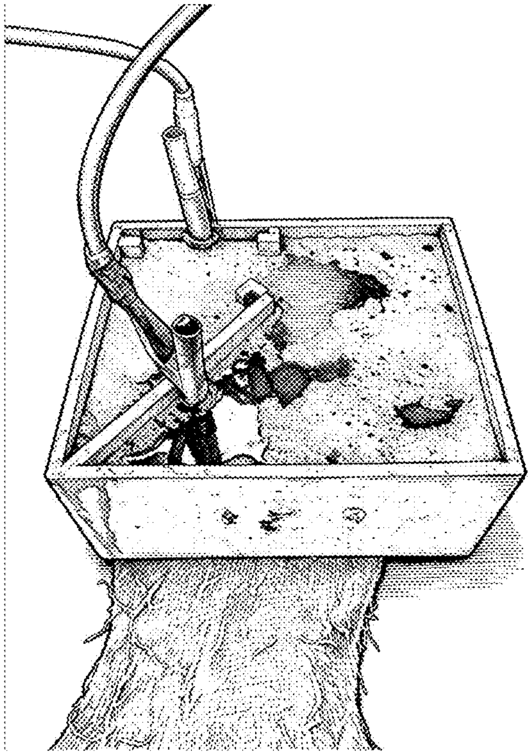
FIG. 2 is an experimental operation diagram according to Example 1 of the present application.
Figure 3:
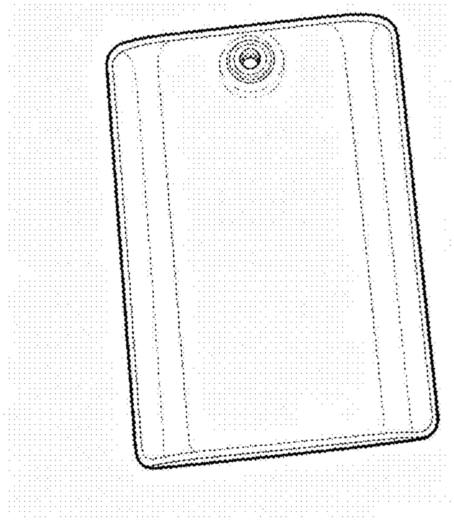
FIG. 3 is an external appearance diagram of the antiviral and environment-friendly product prepared according to Example 1 of the present application.

FIG. 2 is an experimental operation diagram according to Example 1 of the present application; FIG. 3 is an appearance diagram of an antiviral and environment-friendly product prepared according to Example 1 of the present application (the appearance of the products prepared in Example 2, Example 3, and Comparative Examples 1 to 4 is substantially the same as that in FIG. 3). It can be seen that the antiviral and environment-friendly product according to the Examples of the present application has a black-grey plating layer with soft color.

Figure 4:
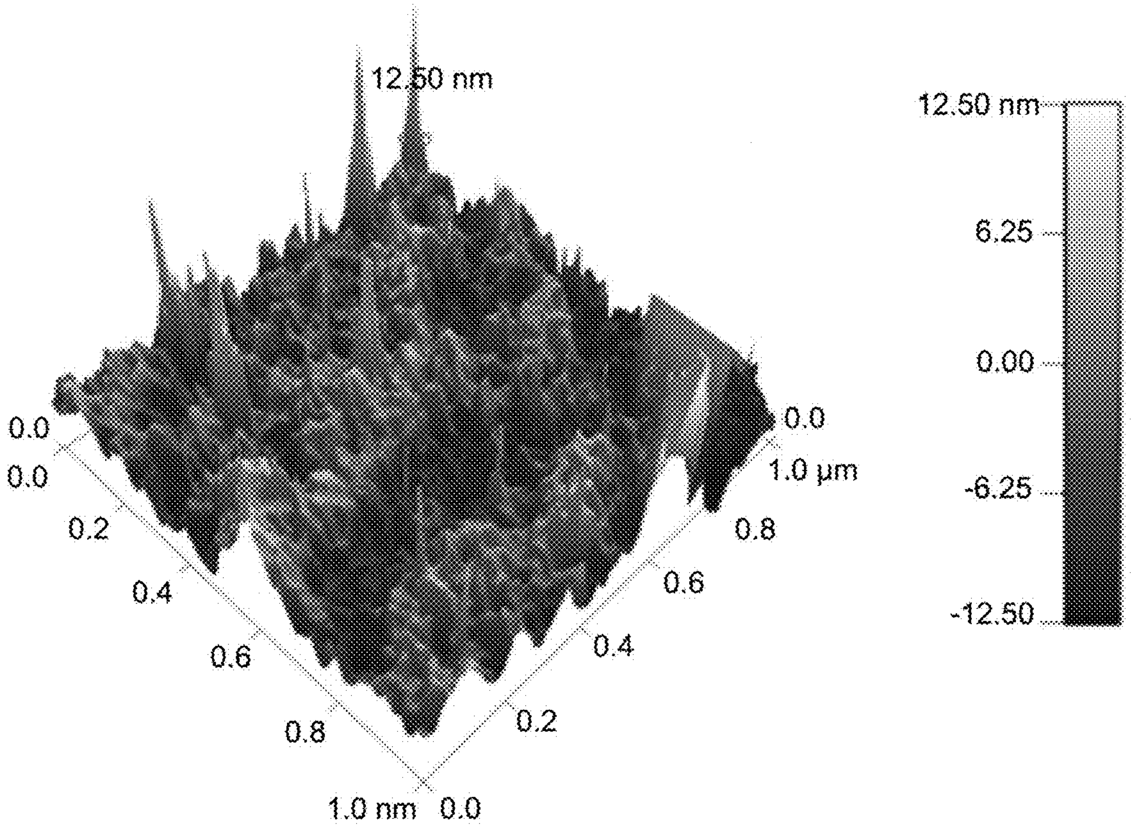
FIG. 4 is an Atomic Force Microscope (AFM) diagram of the surface morphology of the environment-friendly black chromium composite antiviral layer of the antiviral and environment-friendly product according to Example 1 of the present application.
Figure 5:
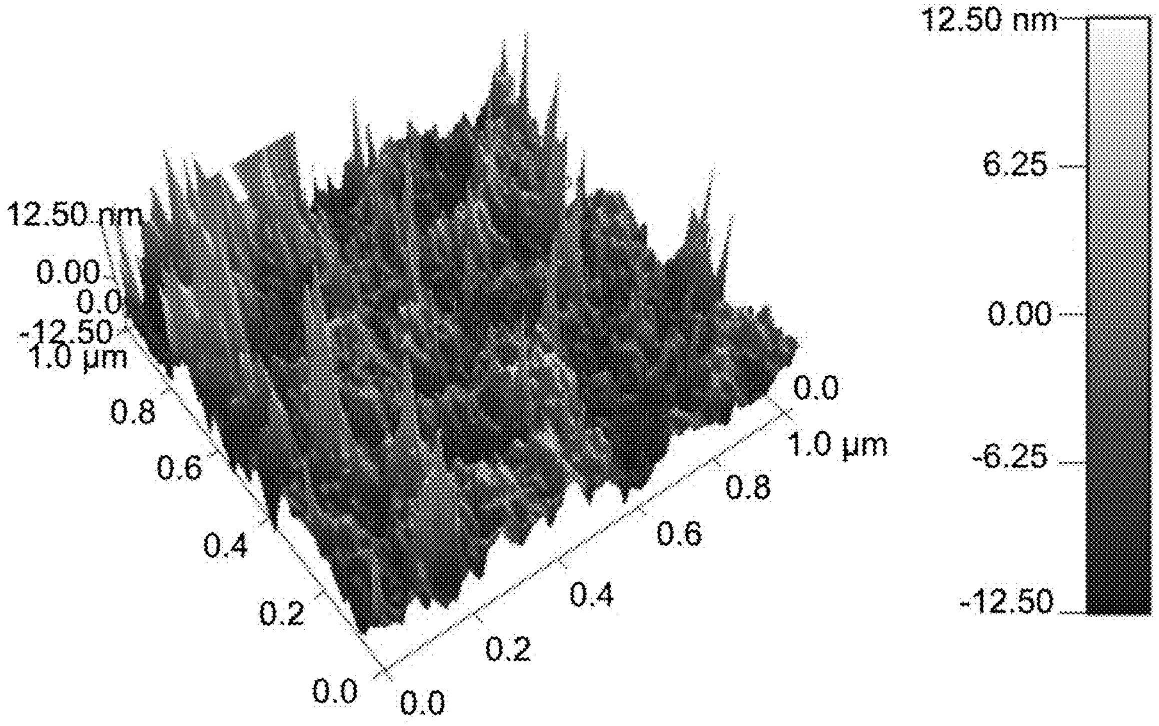
FIG. 5 is an Atomic Force Microscope (AFM) diagram of the surface morphology of the environment-friendly black chromium composite antiviral layer of the antiviral and environment-friendly product according to Example 2 of the present application.
Figure 6:
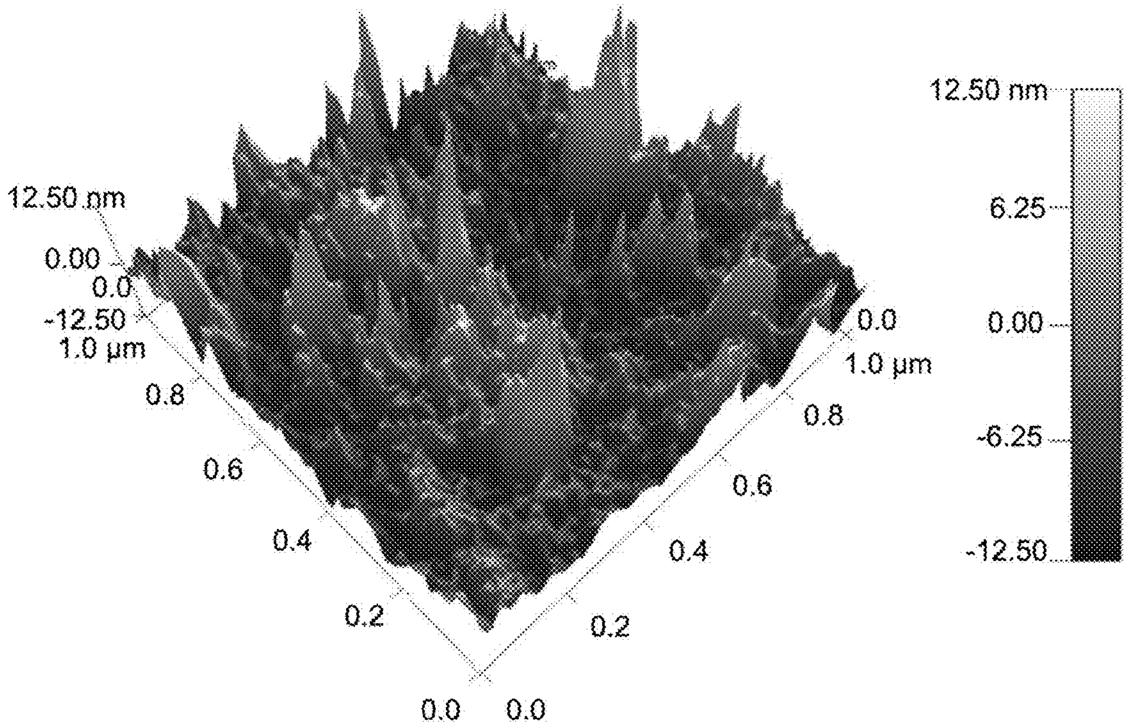
FIG. 6 is an Atomic Force Microscope (AFM) diagram of the surface morphology of the environment-friendly black chromium composite antiviral layer of the antiviral and environment-friendly product according to Example 3 of the present application.
Figure 7:
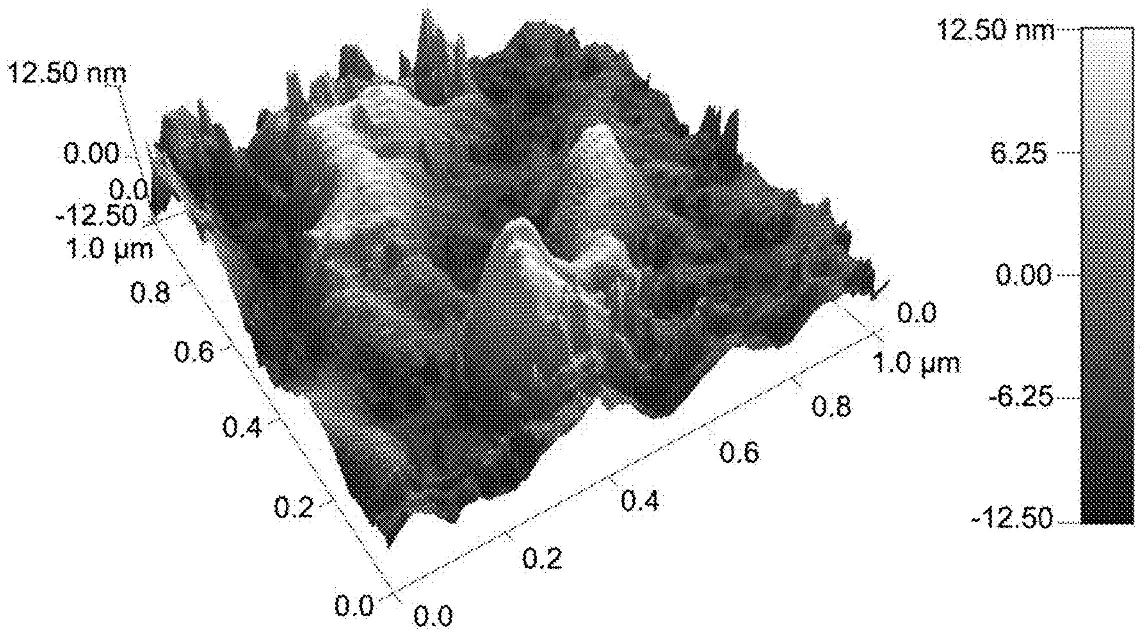
FIG. 7 is an Atomic Force Microscope (AFM) diagram of the surface morphology of the black chromium composite layer of the environment-friendly product according to Comparative Example 1 of the present application.
Figure 8:
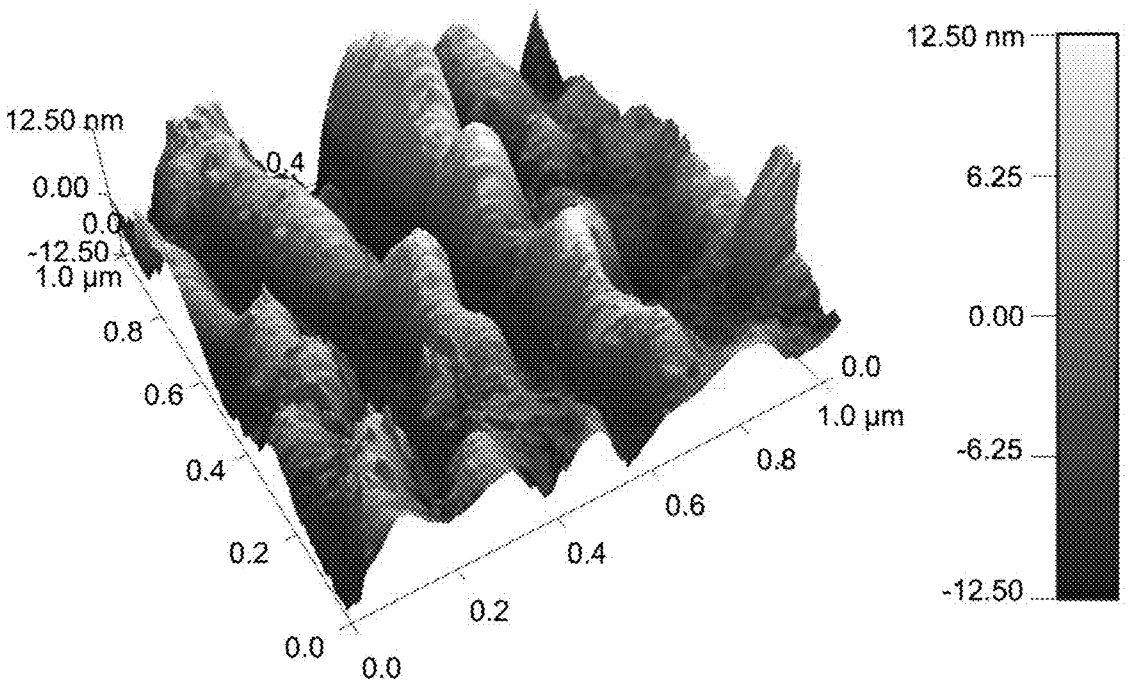
FIG. 8 is an Atomic Force Microscope (AFM) diagram of the surface morphology of the black chromium composite layer of the environment-friendly product according to Comparative Example 2 of the present application.
Figure 9:
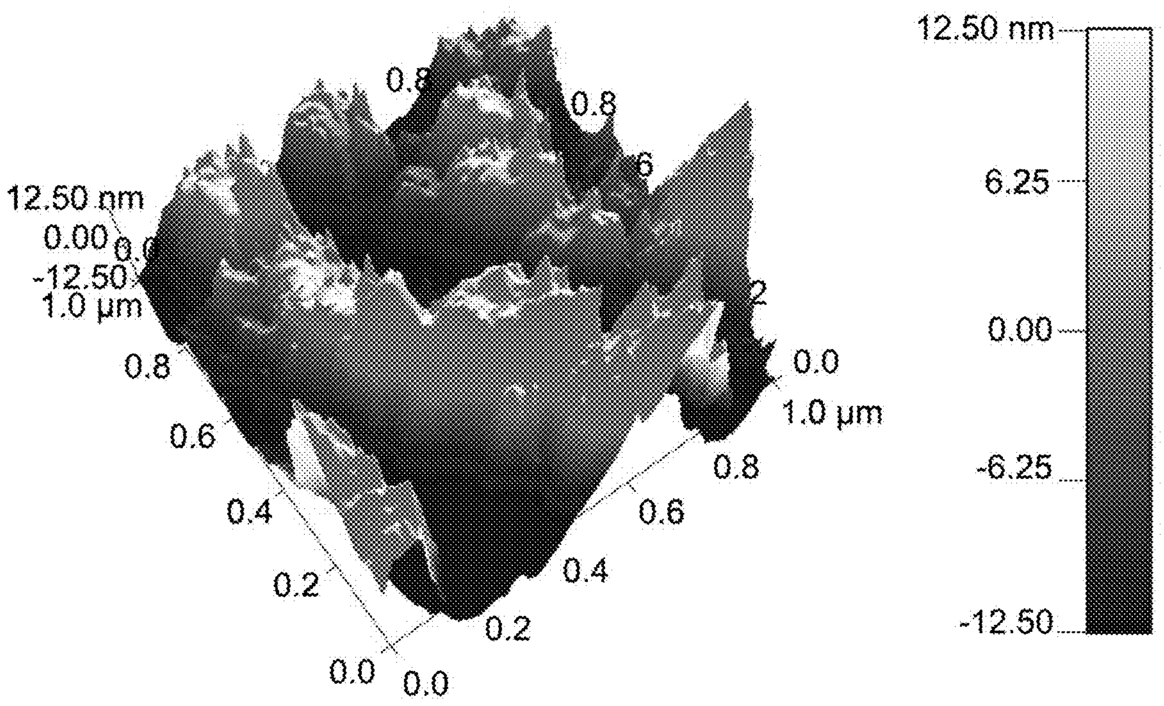
FIG. 9 is an Atomic Force Microscope (AFM) diagram of the surface morphology of the black chromium composite layer of the environment-friendly product according to Comparative Example 3 of the present application.
Figure 10:
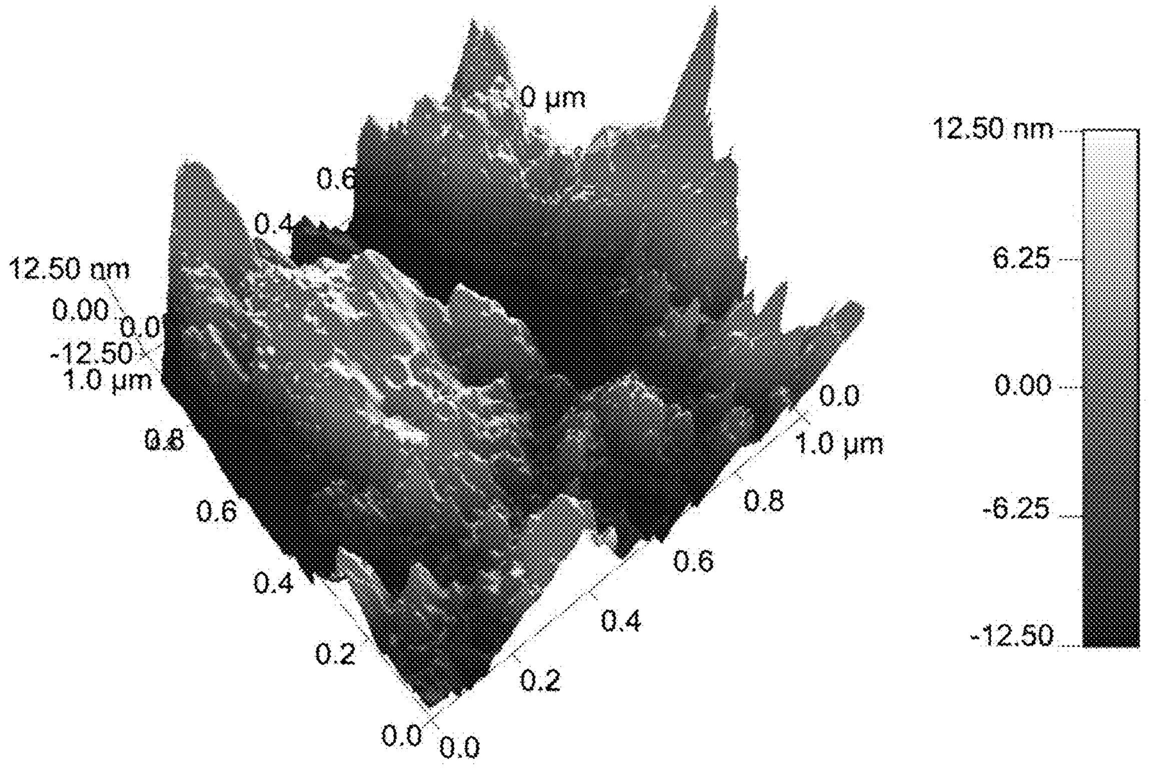
FIG. 10 is an Atomic Force Microscope (AFM) diagram of the surface morphology of the black chromium composite layer of the environment-friendly product according to Comparative Example 4 of the present application.

FIG. 4 is an Atomic Force Microscope (AFM) diagram of the surface morphology of the environment-friendly black chromium composite antiviral layer of the antiviral and environment-friendly product according to Example 1 of the present application; FIG. 5 is an Atomic Force Microscope (AFM) diagram of the surface morphology of the environment-friendly black chromium composite antiviral layer of the antiviral and environment-friendly product according to Example 2 of the present application; FIG. 6 is an Atomic Force Microscope (AFM) diagram of the surface morphology of the environment-friendly black chromium composite antiviral layer of the antiviral and environment-friendly product according to Example 3 of the present application; FIG. 7 is an Atomic Force Microscope (AFM) diagram of the surface morphology of the black chromium composite layer of the black environment-friendly product according to Comparative Example 1 of the present application; FIG. 8 is an Atomic Force Microscope (AFM) diagram of the surface morphology of the black chromium composite layer of the black environment-friendly product according to Comparative Example 2 of the present application; FIG. 9 is an Atomic Force Microscope (AFM) diagram of the surface morphology of the black chromium composite layer of the black environment-friendly product according to Comparative Example 3 of the present application; and FIG. 10 is an Atomic Force Microscope (AFM) diagram of the surface morphology of the black chromium composite layer of the black environment-friendly product according to Comparative Example 4 of the present application.

It can be seen from FIGS. 4 to 10, the environment-friendly black chromium composite antiviral layer of Examples 1 to 3 of the present application does form a nano-needle structure, and the height of the nano-needle is 0 to 12.5 nm. However, the environment-friendly composite layers of Comparative Examples 1 to 4 do not form nano-needle structures, which indicates that the formation of a nano-needle structure requires the participation of quaternary ammonium salts such as hexadecyl trimethyl ammonium iodide and anhydrous citric acid crystals with appropriate concentration.

According to the Chinese national standard GB/T 6461-2002, the corrosion resistance of the products in the Examples and the Comparative Examples is tested by CASS salt spray test method. The results are shown in Table 1.

The antiviral activity of the products in the Examples and Comparative Examples is tested according to ISO 21702: 2019 (human coronavirus HCoV-229E, human coronavirus HCoV-OC43 and chicken coronavirus are used for the test). The results are shown in Table 1.

TABLE 1

| | CASS salt spray test | Antiviral activity test of human coronavirus HCoV-229E (24 h) | Antiviral activity test of human coronavirus HCoV-OC43 (24 h) | Antiviral activity test of chicken coronavirus (24 h) | Remarks |
|---|---|---|---|---|---|
| Example 1 | 24 h, Grade 9 | 99.9% | 99.9% | 99.9% | Nano-needle structure |
| Example 2 | 24 h, Grade 9 | 99.8% | 99.8% | 99.8% | Nano-needle structure |
| Example 3 | 24 h, Grade 9 | 99.6% | 99.9% | 99.9% | Nano-needle structure |
| Comparative example 1 | 24 h, Grade 9 | 70.5% | 69.4% | 69.7% | Non-nano-needle structure |
| Comparative example 2 | 24 h, Grade 9 | 68.3% | 68.5% | 68.5% | Non-nano-needle structure |
| Comparative example 3 | 24 h, Grade 9 | 37.6% | 36.3% | 37.3% | Non-nano-needle structure |
| Comparative example 4 | 24 h, Grade 9 | 72.1% | 72.4% | 72.3% | Non-nano-needle structure |

By comparing Example 1, Example 2, Example 3 with Comparative Example 1, Comparative Example 4, it can be seen that when the concentration of anhydrous citric acid crystal is 10 to 20 g/L and the concentration of hexadecyl trimethyl ammonium iodide is 50 to 100 g/L, the environment-friendly chromium composite antiviral layers of the antiviral and environment-friendly products can form nano-needle structures, and the antiviral and environment-friendly products have better antiviral effect. However, when the concentration of anhydrous citric acid crystals is increased to 30 g/L or the concentration of hexadecyl trimethyl ammonium iodide is increased to 150 g/L, the composite layers of the environment-friendly products do not form nano-needle structures, and the antiviral activity of the antiviral and environment-friendly products against human coronavirus HCoV-229E is decreased to 70.5% and 72.1%, the antiviral activity against human coronavirus HCoV-OC43 is decreased to 69.4% and 72.4%, and the antiviral activity against chicken coronavirus is decreased to 69.7% and 72.3%, respectively.

By comparing Examples 1 to 3 with Comparative Examples 1 to 4, it can be seen that compared with the environment-friendly black chromium composite antiviral layers with nano-needle structures, the antiviral activity of the environment-friendly black chromium composite antiviral layers without nano-needle structures is significantly reduced, indicating that the nano-needle structure is very important for antiviral effect.

In summary, the antiviral and environment-friendly composite plating layer according to the embodiments of the present application has a nano-needle structure, and the antiviral effect of the environment-friendly products comprising the environment-friendly black chromium composite antiviral layer with nano-needle structures is significantly better than that of the environment-friendly products of Comparative Examples without nano-needle structures.

This disclosure is an example of the principles of the embodiments of the present application and is not intended to limit the application in any form or substance, or to limit the application to specific embodiments. It will be apparent to those skilled in the art that the elements, methods and systems, etc. of the technical schemes of the embodiments of the present application may be altered, changed, modified and evolved without departing from the principles, spirit and scope as described above in the embodiments and technical schemes of the present application, as defined in the claims. These altered, changed, modified and evolved embodiments are all included in the scope of equivalent embodiments of the present application, which are all included within the scope of the present application defined by the claims. Although embodiment of the present application may be embodied in many different forms, some embodiments of the present application are described in detail herein. In addition, any possible combination of some or all of the various embodiments described herein is included in the embodiments of the present application and is also included in the scope of the present application defined by the claims. All patents, patent applications and other cited materials mentioned anywhere in the present application or any of the cited patents, cited patent applications or other cited materials are hereby incorporated by reference in their entirety.

The above disclosure is provided as illustrative rather than exhaustive. For those skilled in the art, this specification will suggest many variations and alternatives. All such alternatives and variations are intended to be included within the scope of the claims, wherein the term “including” means “including, but not limited to”.

The description of the alternative embodiments of the present application is completed herein. Those skilled in the art will recognize other equivalent variations of the embodiments described herein, which are also encompassed by the claims appended hereto.

The invention claimed is:

1. An antiviral and environment-friendly composite plating layer, comprising: a semi-bright nickel layer, a microporous nickel layer and an environment-friendly black chromium composite antiviral layer; the semi-bright nickel layer is adapted to be positioned on a substrate having an antiviral requirement; the microporous nickel layer is disposed on the surface of a side of the semi-bright nickel layer away from the substrate; the environment-friendly black chromium composite antiviral layer is disposed on the surface of a side of the microporous nickel layer away from the substrate; the environment-friendly black chromium composite antiviral layer has a nano-needle structure, and is formed by a composite raw material containing antiviral ammonium salt, and the concentration of the antiviral ammonium salt in the composite raw material is 50 g/L to 100 g/L.

2. The antiviral and environment-friendly composite plating layer of claim 1, wherein the antiviral ammonium salt is selected from any one or more of alkyl quaternary ammonium iodide salt and alkyl aromatic hydrocarbyl quaternary ammonium iodide salt.

3. The antiviral and environment-friendly composite plating layer of claim 2, wherein the carbon chain length of the alkyl groups in the alkyl quaternary ammonium iodide salt and the alkyl aromatic hydrocarbyl quaternary ammonium iodide salt is 12 to 18.

4. The antiviral and environment-friendly composite plating layer of claim 1, wherein the antiviral ammonium salt is selected from any one or more of dodecyl dimethyl benzyl ammonium iodide, dodecyl trimethyl ammonium iodide, tetradecyl dimethyl benzyl ammonium iodide, tetradecyl trimethyl ammonium iodide, hexadecyl dimethyl benzyl ammonium iodide, hexadecyl trimethyl ammonium iodide, octadecyl dimethyl benzyl ammonium iodide, and octadecyl trimethyl ammonium iodide.

5. The antiviral and environment-friendly composite plating layer of claim 1, wherein the environment-friendly black chromium composite antiviral layer is formed by being electroplated from an electroplating solution of a raw material comprising: quaternary ammonium iodide salt with a concentration of 50 g/L to 100 g/L, anhydrous citric acid crystal with a concentration of 10 g/L to 20 g/L, trivalent chromium additive with a concentration of 300 g/L to 500 g/L, trivalent chromium stabilizer with a concentration of 50 mL/L to 100 mL/L, trivalent chromium regulator LR with a concentration of 1 mL/L to 10 mL/L, trivalent chromium corrector with a concentration of 2 mL/L to 10 mL/L, and shadow trivalent chromium makeup agent with a concentration of 30 mL/L to 50 mL/L.

6. The antiviral and environment-friendly composite plating layer of claim 1, wherein the thickness of the semi-bright nickel layer is 20 μm to 50 μm, the thickness of the microporous nickel layer is 20 μm to 50 μm, and the thickness of the environment-friendly black chromium composite antiviral layer is >0.5 μm.

7. A preparation method of the antiviral and environment-friendly composite plating layer of claim 1, comprising:

(1) pretreating the substrate: including polishing and cleaning treatments;

(2) electroplating the semi-bright nickel layer on the surface of the pretreated substrate;

(3) electroplating the microporous nickel layer on the surface of the semi-bright nickel layer;

(4) electroplating the environment-friendly black chromium composite antiviral layer on the surface of the microporous nickel layer.

8. The preparation method of claim 7, wherein the conditions for electroplating the semi-bright nickel layer in step (2) include: a temperature of 45° C. to 60° C., a cathode current density of 5 $A/dm^2$ to 15 $A/dm^2$, and an electroplating time of 900 s to 1800 s.

9. The preparation method of claim 7, wherein the conditions for electroplating the microporous nickel layer in step (3) include: a temperature of 45° C. to 60° C., a cathode current density of 5 $A/dm^2$ to 15 $A/dm^2$, and an electroplating time of 900 s to 1800 s.

10. The preparation method of claim 7, wherein the conditions for electroplating the environment-friendly black chromium composite antiviral layer in step (4) include: a temperature of 30° C. to 40° C., a cathode current density of 8 A/$dm^2$ to 15 A/$dm^2$, and an electroplating time of 900 s to 1200 s.

11. An antiviral and environment-friendly product, comprising a substrate and the antiviral and environment-friendly composite plating layer of claim 1.

12. The antiviral and environment-friendly product of claim 11, wherein the substrate is a metal substrate or a plastic substrate.

13. The antiviral and environment-friendly product of claim 11, wherein the antiviral and environment-friendly product is an antiviral product used in kitchen or bathroom.

* * * * *